Figures 1, 2:
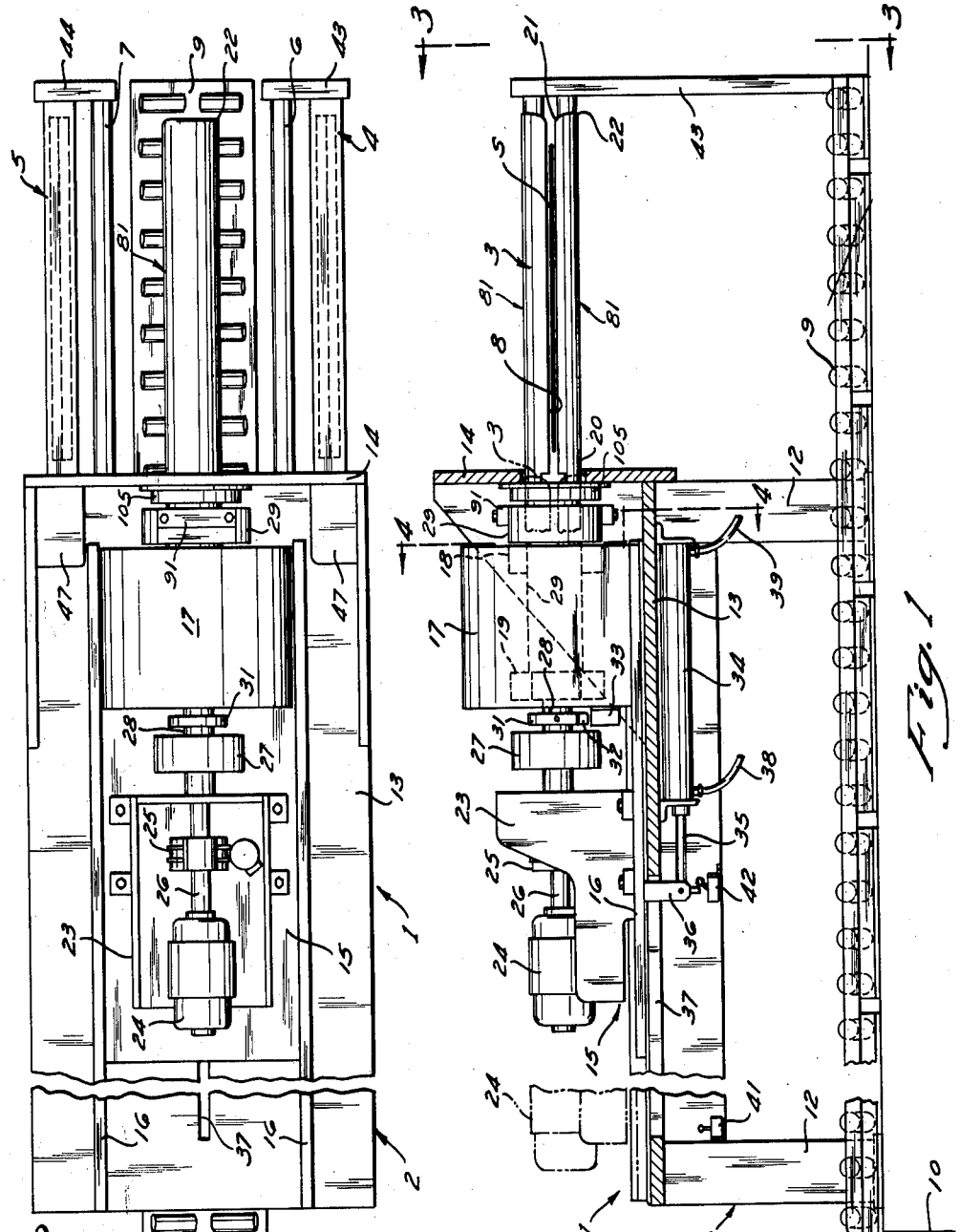

April 30, 1963 L. V. ANDERSON ETAL 3,087,688
STRIP WINDER
Filed Jan. 9, 1961 4 Sheets-Sheet 1

INVENTORS
LYLE V. ANDERSON,
& ARTHUR WILLIAM YOUNKES
BY
Bosworth, Sessions
Herrstrom & Knowles
ATTORNEYS

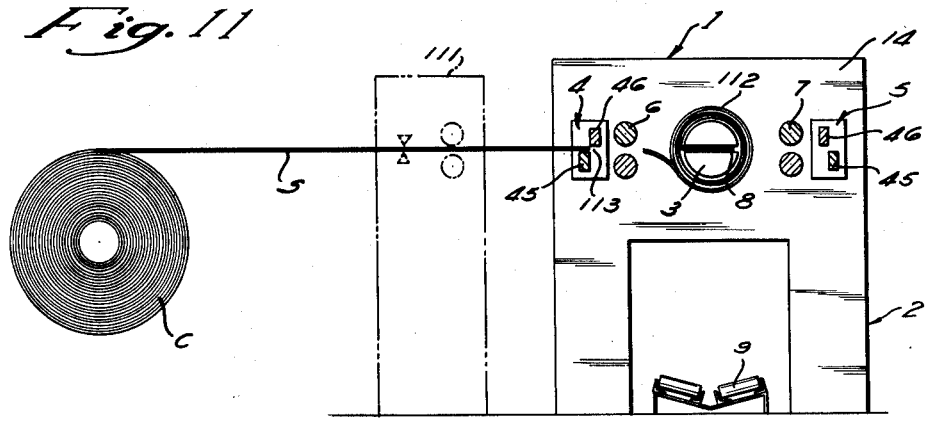
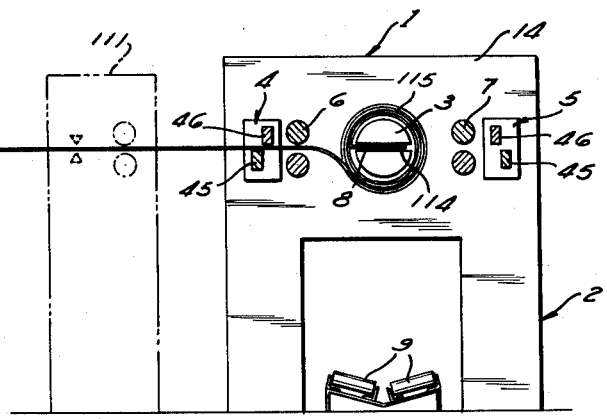
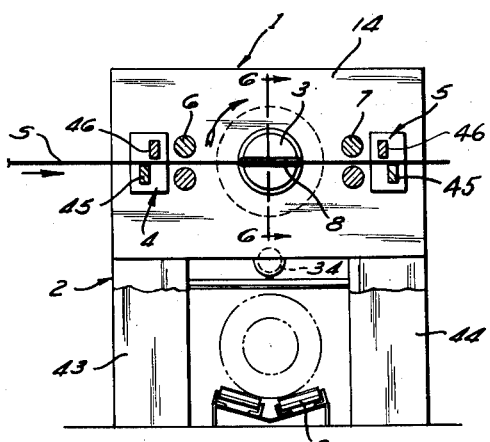
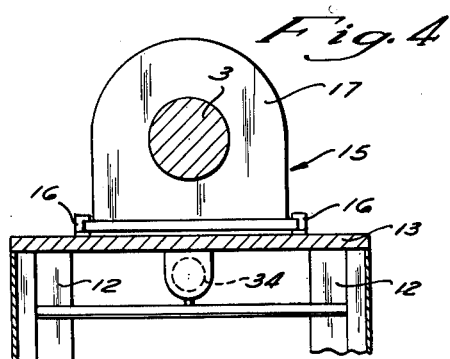

April 30, 1963 L. V. ANDERSON ETAL 3,087,688
STRIP WINDER
Filed Jan. 9, 1961 4 Sheets-Sheet 3

INVENTORS
LYLE V. ANDERSON,
& ARTHUR WILLIAM YOUNKES
BY
Bosworth, Sessions
Herrstrom & Knowles
ATTORNEYS April 30, 1963 L. V. ANDERSON ETAL 3,087,688
STRIP WINDER
Filed Jan. 9, 1961 4 Sheets-Sheet 4
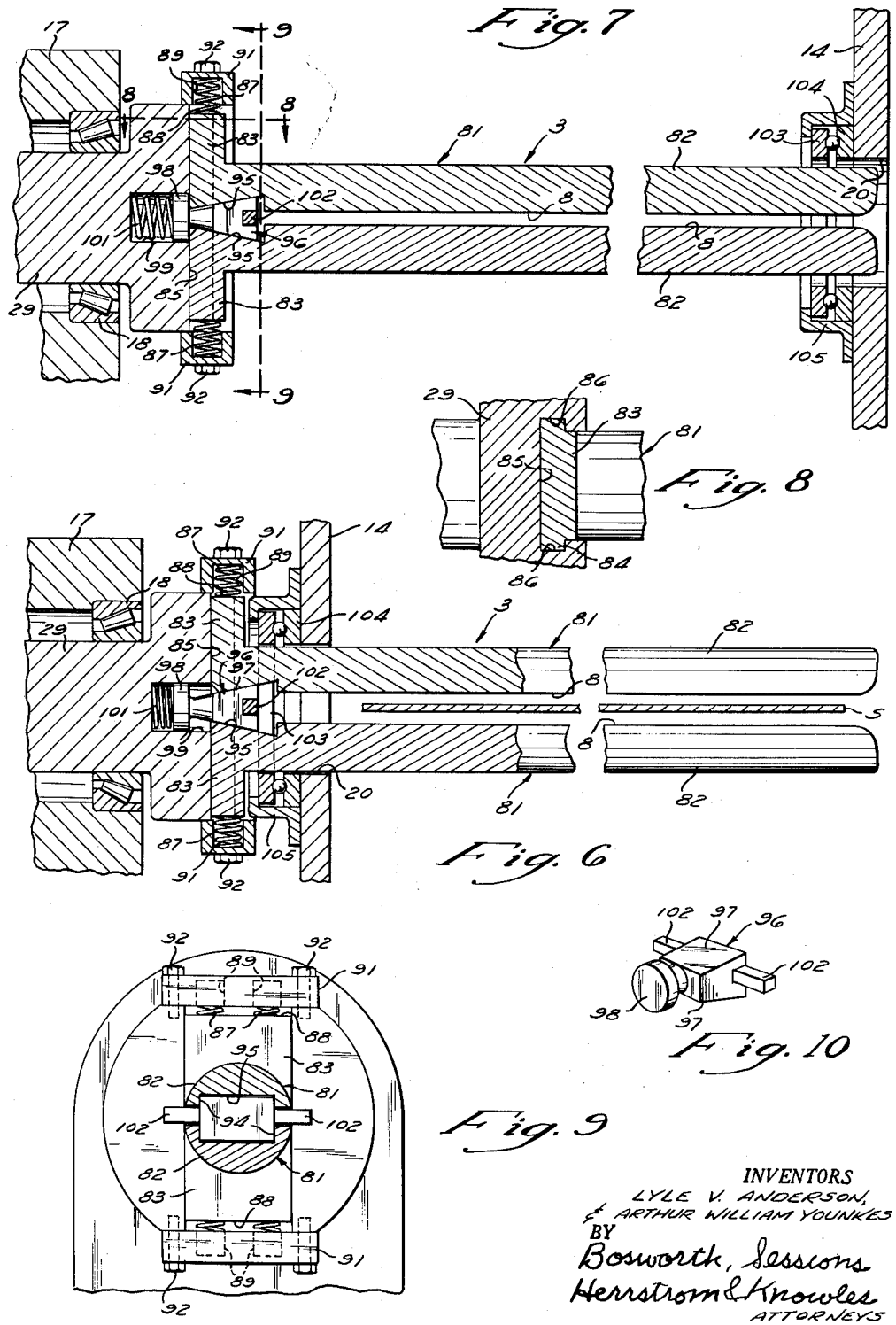
INVENTORS
LYLE V. ANDERSON,
& ARTHUR WILLIAM YOUNKES
BY
Bosworth, Sessions
Herrstrom & Knowles
ATTORNEYS

United States Patent Office 3,087,688
Patented Apr. 30, 1963

3,087,688
STRIP WINDER
Lyle V. Anderson, Pittsburgh, and Arthur William Younkes, Ross Township, Allegheny County, Pa., assignors to Blaw-Knox Company, Pittsburgh, Pa., a corporation of Delaware
Filed Jan. 9, 1961, Ser. No. 81,406
10 Claims. (Cl. 242—56)

This invention relates to apparatus for cutting and winding strip material, and more particularly to such apparatus employing a slotted mandrel which makes possible the cutting and winding of strip material with a substantial saving in time and labor in starting the strip material on the mandrel.

While the apparatus of the invention may be advantageously employed for various uses, it provides particular benefits when employed in a line for high speed continuous processing, such as annealing or tin plating of strip steel or other metal originating in coils. In such a line, it is usually necessary to cut off the leading end portion of a coil to remove material which is off-gauge or otherwise rejectable; then after the remaining usable metal of the coil has been largely unwound and processed, a portion containing substandard material usually must be cut from the tail end of the coil. Defective material must then be cut off the leading end of another coil to form a new leading edge which can be welded to the newly cut tail end of the first expended coil to form a continuation of the strip which is to be processed, and so on as long as desired. The disposition of such substandard cut off leading and tail end portions presents serious problems, particularly because of their length which may vary from a few feet to many feet, and because of the relatively high rate at which such end portions accumulate in operation of high speed continuous strip processing lines.

It has been proposed that these cut off leading and tail end portions be put into compact form by winding them on mandrels to form scrap coils. However, considerable time, labor and skill are usually required to start the leading edge of a substandard leading end portion onto the mandrel, to control the operation of the mandrel so it rotates the proper number of times to wind the portion onto the mandrel, to cut the portion from the coil strip, and then to remove the resulting scrap coil from the mandrel. Similarly, considerable time, skill and labor are required to cut a substandard tail end portion from a strip after it has left the coil, to start the leading edge of the cut off portion onto the mandrel, to control the mandrel to wind the end portion on the mandrel, and then to remove the resulting scrap coil from the mandrel. Although the skilled labor for performing these operations is costly, even more costly is the loss of production time resulting when the continuous processing line is halted for the substantial periods necessary to perform such operations.

Figure 5:
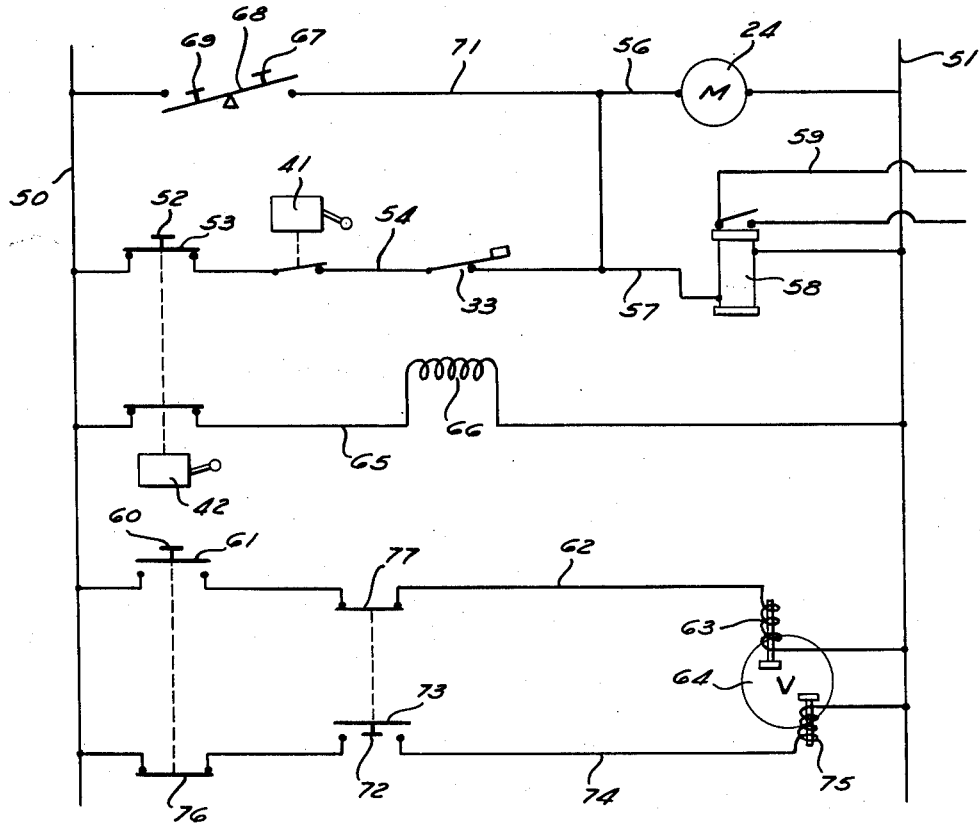
Figure 13:
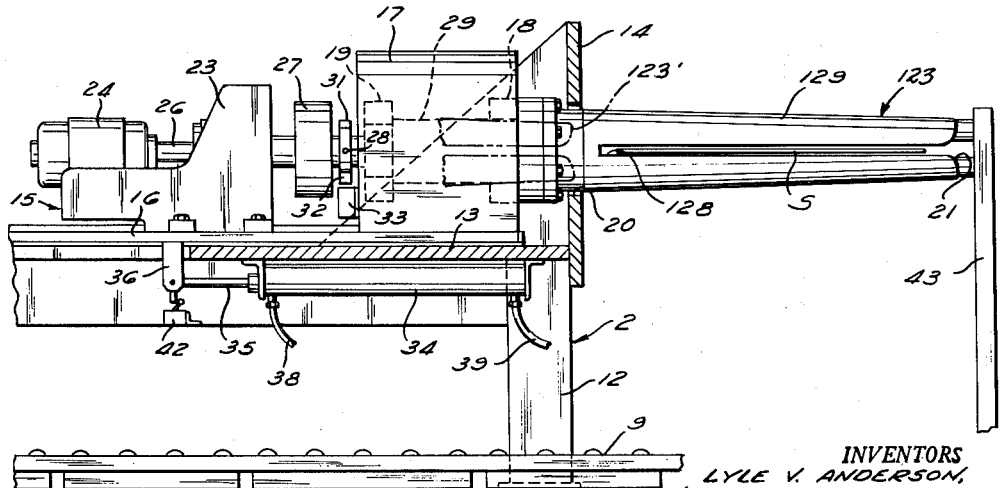

A general object of the invention is to provide cutting and winding apparatus which solves the above problems and eliminates the above disadvantages. Another object is the provision of apparatus for winding and cutting a leading end portion of a strip of material originating from a coil or other suitable source, with a minimum of manual effort, skill and time. A further object is the provision of apparatus for cutting and winding the tail end portion of a strip of material, such as that originating in a coil, with minimum of manual effort, skill and time. Further objects and advantages of the invention will become apparent from the following description of a preferred form thereof, reference being made to the accompanying drawings in which:

FIGURE 1 is a side elevation of a preferred form of apparatus embodying the invention, with parts broken away, such apparatus comprising a slotted extendable and retractable mandrel which is expandable and collapsible in cross section, the apparatus being shown as employed in a steel conditioning line to cut and wind into scrap coil the substandard leading and tail end portions of coils of steel strips;

FIGURE 2 is a plan of the apparatus of FIGURE 1;
FIGURE 3 is an end elevation of such apparatus, from line 3—3 of FIGURE 1, but to a smaller scale;
FIGURE 4 is a sectional elevation along line 4—4 of FIGURE 1, and to the same scale;
FIGURE 5 is a circuit diagram illustrating a preferred form of control system for the apparatus;
FIGURE 6 is a sectional elevation along line 6—6 of FIGURE 3 but to an enlarged scale of the slotted mandrel of the embodiment of the preceding figures, the mandrel of FIGURE 6 being shown in its extreme extended position and in its expanded condition;
FIGURE 7 is a sectional elevation, generally taken along the same plane as FIGURE 6 and to the same scale, showing the mandrel of FIGURE 6 in its extreme retracted position, the mandrel being in its collapsed condition;
FIGURE 8 is a detail sectional elevation along lines 8—8 of FIGURE 7 and to the same scale;
FIGURE 9 is a sectional elevation along line 9—9 of FIGURE 7 and to the same scale;
FIGURE 10 is a perspective elevation of the wedge member embodied in the expandable mandrel of FIGURES 6 and 7;
FIGURE 11 is a somewhat diagrammatic representation showing the apparatus of the preceding figures as employed in coiling and then cutting a substandard leading portion of a strip of steel originating in a coil;
FIGURE 12 is a somewhat diagrammatic representation showing the apparatus of the preceding figures as employed in cutting and then coiling a substandard tail end portion of a strip of steel originating in a coil; and
FIGURE 13 is a side elevation of another form of apparatus embodying the invention, this apparatus comprising a non-expandable solid tapered slotted mandrel, the apparatus being otherwise identical to that of FIGURE 1.

As shown in FIGURES 1, 2 and 3, a preferred form of the apparatus of the invention generally indicated by reference character 1, comprises a frame 2 slidably supporting a cantilever winding mandrel 3 for rotation about a substantially horizontal axis. A strip cutting means or shear generally indicated by reference numeral 4 is located on one side of the mandrel, while another strip cutting means or shear generally indicated by reference character 5 is located on the other side of the mandrel. Guide rollers 6 are located between strip cutting means 4 and mandrel 3, and guide rollers 7 are located between mandrel 3 and strip cutting means 5. The mandrel has a slot 8 extending diametrically through the mandrel and from its free end to its supported end for a distance sufficient to receive the maximum width of strip to be handled by the apparatus; as will be described in more detail later, this mandrel is adapted to be extended to the position shown in full lines in FIGURE 1, and to be retracted to the position shown in broken lines in this figure. In this embodiment, moreover, the mandrel is adapted to be expanded to a maximum cross section when in its fully extended position as shown in FIGURE 6 and to be contracted to a smaller cross section as it is retracted as shown in FIGURE 7 to aid in removal of the wound coil. A scrap conveyor 9, shown as a roller conveyor, extends below the mandrel and is adapted to receive the coil of scrap strip material wound on the mandrel, and discharged from the mandrel as it retracts, and to carry the scrap coil to a scrap pit 10. Preferably, the conveyor 9 is slightly inclined downwardly from the mandrel toward the scrap pit, to aid in conveying the removed coil toward the scrap pit.

More specifically, the frame 2 comprises four upright legs 12 rigidly supporting a horizontal top member 13, and a non-rotatable vertical stripper plate 14 mounted at the front of the top member and having an opening 20 through which the mandrel extends. A carriage 15 is slidably carried to the top member 13 by suitable guides 16, for forward and rearward movement in the direction of the mandrel axis. The carriage 15 includes and rigidly supports a bearing-supporting member 17 in which are mounted the bearings 18 and 19 by which the mandrel 3 is rotatably mounted; member 17 and bearings 18 and 19 are preferably massive to provide the desired support for the horizontally projecting cantilever mandrel 3 and the coil wound thereon.

The free or unsupported end of the mandrel is formed with curves 21 at the outer end of the slot 8, and with the curve 22 at the peripheral edge of the mandrel. The curves 21 permit the slot 8 to readily pass over a strip of sheet metal S extending substantially horizontally and transversely across the front of the apparatus, since the curves 21 guide the strip into the slot; the curve 22 on the outer edge of the free end of the mandrel facilitates discharge of a coil wound on the mandrel when the mandrel is retracted.

Rigidly mounted on the carriage 15 is a bracket 23 which supports an electric motor 24 and an electrically operated brake 25 adapted to control the rotation of motor shaft 26; the brake may be of the conventional electromagnetic type which is released only when electrical current is passed through the magnet windings. An overload slip clutch 27 preferably connects one end of motor shaft 26 to shaft 28 at the drive end of the spindle 29 carrying the mandrel 3; this slip clutch may be of any suitable type, such as a commercially available torque coupling device.

The illustrated apparatus also includes means for controlling the brake 25 to stop the rotation of the mandrel with the slot 8 in a predetermined, preferably horizontal, position in which it is aligned with the path of travel of the strip S. Such means comprises a collar 31, preferably formed of non-magnetic metal, rigidly but adjustably mounted on the shaft 28 at the drive end of the mandrel spindle 29; the collar rigidly carries a projecting lug 32 formed of magnetic metal. A proximity sensor switch 33, of a commercially available type which is actuated by the proximity of magnetic metal, is mounted on the carriage 15. The collar 31, its lug 32, and the switch 33 are so located that when rotation of the mandrel 3 brings the lug 32 into close proximity of the switch 33, the switch, through suitable circuit means, actuates the brake 25 to stop rotation of the mandrel 3 with the slot 8 in the horizontal position.

In order to advance and retract the mandrel 3 a suitable air cylinder 34 is rigidly fixed to the underside of top frame member 13. The projecting end of piston rod 35 of cylinder 34 is connected to a lug 36 fixed to and projecting from the underside of carriage 15 through a slot 37 in top frame member 13. Conduits 38 and 39, connected to the ends of the interior of the air cylinder 34 and to a suitable source of air under pressure through control means described below, supply air under pressure which moves the piston rod 35 to move the mandrel from its extended to its retracted positions and vice versa, as required.

Limit switches 41 and 42 are fixed to the frame 2 in such positions that at the ends of the stroke of the piston rod 35 they are engaged by the lug 36; limit switch 41 is actuated by lug 36 when the mandrel 3 and its supporting carriage 15 are in the extreme retracted position, and limit switch 42 is actuated by lug 36 when the mandrel and its carriage are in the extreme advanced position, these limit switches controlling operatoin of the apparatus in a manner to be later described.

The illustrated apparatus also includes upright stanchions 43 and 44 located at the front of the apparatus on each side of the mandrel 3 and beyond the outer end of the mandrel when it is in its extreme extended position; these stanchions support the outer ends of the guide rolls 6 and 7; the inner ends of these guide rolls are rotatably supported from the frame 2 of the machine, and if desired, positively rotated by suitable means, not shown, carried by the frame. Stanchion 43 also supports the outer end of shear 4, and stanchion 44 supports the outer end of shear 5. While the cutting means or shears 4 and 5 may be of any one of several known types, each of the illustrated shears comprises a lower stationary blade 45 and an upper, vertically reciprocable blade 46 which is adapted to be moved downwardly to shear a strip S when desired. Each of the blades 46 may be vertically moved by suitable conventional means contained in housing 47 and not otherwise illustrated, and is controlled as later described.

The electrical circuits for controlling the above described apparatus are diagrammatically shown in FIGURE 7.

Electrical power is supplied from lines 50 and 51. Assuming the "reset" button 52 forming part of the apparatus has been depressed to close the switch 53 in circuit 54, and the carriage 15 and mandrel 3 to be in the extreme retracted position, the normally open limit switch 41 is closed by lug 36 on carriage 15 (see FIGURE 1). The normally closed proximity sensor switch 33 completes the circuit 54, 56, through the motor 24, and the circuit 57 through the coil of the brake relay 58. This brake relay is connected to the brake 25 through suitable circuit means, partly shown at 59, so that when the relay 58 is energized it energizes the electromagnet of the brake and releases the brake; and when the relay 58 is not energized, the brake electromagnet is de-energized and the brake is set to hold the mandrel 3 against rotation. Consequently, when the push button 52 is depressed while the limit switch 41 is actuated as described above when the mandrel carriage 15 is retracted, the brake 25 is released and the motor 24 is energized to rotate the mandrel 3. When the magnetic lug 32 on collar 31 mounted on the mandrel shaft 28 rotates into close proximity to the sensor switch 33, it causes the switch to open circuit 54, thus stopping the motor 24, de-energizing relay 58 and causing the brake 25 to stop rotation of the mandrel 3 with its slot 8 aligned with the path of strip S, so that the mandrel is properly positioned for forward travel.

When the "forward" push button 60 is depressed, it closes the switch 61 and completes circuit 62 to energize the one solenoid 63 of a conventional double solenoid four way air control valve 64 to actuate the valve to cause air under pressure to flow through conduit 38 (see FIGURE 1) of the air cylinder 34 and move the carriage 15 and mandrel 3 forward to the advanced position, where the slot of the mandrel can receive the strip S. When the carriage 15 is in its advanced position, the lug 36 (FIGURE 1) opens the normally closed limit switch 42, thus opening the circuit 65 and de-energizing the circuit means, represented by coil 66, which renders operative the proximity sensor switch 33; the sensor switch is thereby rendered inoperative and closes, since it is normally biased to close. Opening of the limit switch 42 also causes the switch 53 in circuit 54 to open, since switch 42 in circuit 65 and switch 53 in circuit 54 are mechanically or otherwise coupled for this purpose; circuits 54 and 65 therefore are opened and cannot be closed until the "reset" push button 52 is depressed.

The mandrel 3 can then be rotated to cause it to coil strip material S (the end of which is engaged in the slot 8), by depressing the "start" push button 67 of a two-way switching device 68 which also has a "stop" push button 69; depression of push button 67 closes the circuit 71 which through circuits 54 and 57 energizes the brake relay 58 to release the brake 25, and through circuit 56 energizes the motor 24 to cause it to rotate the mandrel 3. After the mandrel has rotated until the desired length of strip is wound on it in coil form, the "stop" push button 69 is depressed, which opens circuit 71 and thereby causes the brake 25 to set and the motor 24 to stop.

The mandrel 3 may be retracted to strip the coil by depressing the "retract" push button 72. This closes the switch 73 and completes the circuit 74 to energize the other solenoid 75 operatively connected to air control valve 64. Air under pressure then passes through conduit 39 into cylinder 34 (see FIGURE 1), thus causing retraction of the cylinder 15 and the mandrel 3 carried by it. When the carriage reaches its extreme retracted position, lug 36 actuates limit switch 41 to close it, as described above. To repeat the cycle, it is necessary to depress the "reset" button 52; this closes switch 53 to complete circuit 54 and switch 42 to complete circuit 65, thus providing a safety feature. Preferably, another safety feature is provided by mechanically or otherwise coupling switch 61 operated by the "forward" push button 60 in circuit 62 to a switch 76 in circuit 74, in such manner that when switch 61 is closed switch 76 is open, and vice versa; and by mechanically or otherwise coupling switch 73 operated by "retract" push button 72 in circuit 74, to a switch 77 in circuit 62 in such manner that when the switch 72 is closed the switch 77 is opened, and vice versa. Therefore, if both buttons 60 and 72 should be inadvertently simultaneously depressed, both circuits 62 and 74 are opened, the solenoids connected to the valve cannot operate and the carriage will not move in either direction.

The structure and operation of the expandable mandrel 3 can be understood in connection with FIGURES 6–12 inclusive, FIGURE 6 depicting in cross section the mandrel when it is expanded and in its extreme advanced position, and FIGURE 7 depicting in cross section the mandrel when it is collapsed and in its extreme retracted position. As is shown in these figures, the illustrated mandrel 3 comprises two identical elongated segment members 81, each having a curved coil-supporting surface 82; the segment members are slidably supported for radial movement by the mandrel spindle member 29. Each of the segment members 81 has a transversely outwardly extending rear portion 83 provided with shouldered side edges 84 closely fitting in a way 85 extending radially of spindle member 29 and provided with shouldered side edges 86, as shown in FIGURE 8. Consequently, each of the segment members 81 is accurately located against any movement realtively to spindle member 29 other than radial movement toward and away from the spindle axis.

Each of the segment members 81 is strongly biased toward the spindle axis by springs 87 bearing against flat surfaces 88 on the outer edges of rear portions 83 of the segment members, the other ends of the springs being contained in sockets 89 formed in cap member 91 fixed, as by bolts 92 to opposite flat sides 93 of spindle member 29.

The rear portion of each spindle of each mandrel segment 81 is formed with an internal groove 94 having a bottom surface 95 which is inclined outwardly from the rear of the segment. Cooperating with these surfaces is a wedge member 96 (shown in FIGURE 10) having inclined outer surfaces 97 adapted to bear against and slide along the inclined surfaces 95 of the segment members 81. Wedge member 96 also includes a fixed circular plunger portion 98 adapted to slidably fit in a bore 99 extending axially inward of spindle member 29 from the way 85. An expansion type spring 101 bearing against the bottom of the bore and the face of the plunger portion 98 remote from the inclined surfaces 97 of wedge member 96 urges such wedge member axially away from the spindle member 29; movement of wedge member 96 away from spindle 29 is limited by contact of the plunger portion 98 with the ends of mandrel segments 81, as shown in FIGURE 7. Wedge member 96 is also provided with two laterally extending portions, taking the form of bar portions 102 in the illustrated embodiment. These portions 102 are adapted to bear against, but not be connected to, the race 103 of a thrust bearing 104 fixed to the stripper plate 14, as by cap member 105. The portions 102 of the wedge member 96 contact the bearing race 103 only when the mandrel 3 is at or near the end of its extended position, as shown in FIGURE 6.

The operation of the illustrated mandrel is as follows, beginning with the mandrel in its extreme retracted position as shown in FIGURE 7. When the mandrel is in this position, the end of the mandrel is within the opening 20 of the stripper plate 14, and the bearing 104 carried by the stripper plate is spaced from the wedge member 96 by substantially the length of the mandrel. When the mandrel is advanced toward its extended position, the transversely extending portions 102 of the wedge member 96 contact the outer race 103 of the bearing 104 as the mandrel nears the end of the advancing stroke. Pressure of the race 103 against the portions 102 of the wedge member 96 forces the wedge member toward the spindle member 29 against pressure of the spring 101; this causes the inclined surfaces 97 of the wedge member to bear slidably against the inclined surfaces 95 of the mandrel segment members 81, thus forcing them radially outward in the way 85 against the forces exerted by springs 87. Thus, when the mandrel 3 is extended to its extreme position, it has its maximum cross-sectional size, as shown in FIGURE 6. When the mandrel is subsequently rotated in such extended position, the transverse portions 102 of the wedge member 96 bear against and rotate with the race 103 of the thrust bearing 104 carried by the stripper plate 14. As the mandrel 3 is retracted, the rear portions of its segments 81 move away from the race 103 of the bearing 104 reducing the pressure of the bearing race on the transverse portions 102 of the wedge member 96, so that the spring 101 forces the wedge member 96 axially toward the free ends of the mandrel segments 81 and the inclined surfaces 97 of the wedge member 96 slide along the inclined surfaces 95 of the mandrel segments 81. The mandrel segments are urged inwardly toward the axis of the spindle by the springs 87, so that the inclined surfaces 95 and 97 are maintained in contact. After the mandrel has retracted a short distance, the portions 102 of the wedge member 96 separate from the race 103 of the bearing 104, and remain separated for the remainder of the retraction stroke. As a result, the wedge member 96 is forced to its extreme position within the mandrel by the spring 101, as shown in FIGURE 7, thus permitting the mandrel segments to be forced by springs 87 to their closest position to the mandrel axis so that the mandrel is in its collapsed condition of smallest cross section, as shown in FIGURES 7 and 9.

The operation of the apparatus as a whole to cut and wind the scrap leading end of a coil of strip steel is somewhat diagrammatically illustrated in FIGURE 11. As shown in this figure, the leading end portion of a strip S of steel originating in the coil C passes through a gauging device, shown in broken lines as 111, and thence to the apparatus 1 embodying the invention, passing between the blades 45 and 46 of the shear 4 and between the guide rollers 6. The extreme leading end of this portion is inserted into the slot 8 of the mandrel 3 of the apparatus, the slot 8 having been aligned with the horizontal path of the strip and the mandrel expanded and advanced by the means previously described. The mendrel is then rotated until the gauging device 111 indicates that all of the off-gauge steel strip in the leading portion of the steel has been drawn off the coil C. The shear 4 is then actuated to cut the strip, and the rotation of the mandrel 3 continued until all of the cut off portion is wound on the mandrel in the formof a scrap coil 112. If desired, this coil may be banded. The mandrel is then collapsed and retracted by the means described above and the coil 82 stripped from it by stripper plate 14; the coil drops on to the scrap conveyor 9 which carries it to the scrap pit 10. The newly formed leading end 113 of the strip and succeeding portions of the coil C then pass transversely across the front of the apparatus in a horizontal path to and through the subsequent processing. If desired, the strip S may travel through the slot 8 of the mandrel 3 while it is in its extended position, as is shown in FIGURE 3; in this case the mandrel can be rotated until the slot is properly aligned and then advanced as described above, before the leading edge of the strip is passed across the front of the apparatus 1, so that the leading end is caused to pass through the slot. Otherwise the mandrel may be advanced to its extended position while the strip S is passing across the front of the apparatus, the alignment of the slot with the path of travel of the strip being necessary in either case.

FIGURE 12 diagrammatically shows the conditions which may obtain after the coil C has been largely unwound and a scrap tail end portion has been reached. In this case, the gauge device 111 indicates when the off-gauge tail end portion has been reached. The shear 5 is then actuated to cut the off-gauge tail end portion from the main strip, to form a cut-off tail end portion having a new leading edge 114 which is contained in the slot 8 of the extended and expanded mandrel 3. The mandrel is then rotated by the means previously described until the entire scrap tail end portion of the coil D has been wound on the mandrel to form a coil 115. The mandrel may then be collapsed and retracted as described above to strip the coil and let it drop on the scrap conveyor. The mandrel may then be controlled to position its slot 8 in the proper rotational position and may then be expanded and moved to its extreme extended position, by the means described above. It is then ready to receive the leading end of another coil to form a scrap coil of the rejectable leading end portion of such coil as described above in connection with FIGURE 11, or to have a strip pass through the slot on its way to subsequent processing operations.

FIGURE 13 shows apparatus constituting another embodiment of the invention. In this apparatus, the mandrel 123 is not expandable but is of unitary construction and is bolted to the spindle 29 rotatably supported in the bearing supporting member 17 forming part of a carriage 15 slidably mounted on a frame 2. The mandrel 123 has a slot 128 extending diametrically through the mandrel from its free end to its supported end for a distance sufficient to receive the maximum width of strip S to be handled by the apparatus. The exterior coil-supporting curved surface 129 of the mandrel is tapered as shown from a maximum diameter near the supported end of the mandrel to a minimum diameter at the front supported or free end of the mandrel; this facilitates stripping by plate 14 of the scrap coil wound on the mandrel while the mandrel is retracted to the position shown by broken lines 123'. In all other respects the apparatus of FIGURE 13 is identical to that of the previous embodiment and operates in the same manner.

The apparatus of the invention thus makes possible the winding and cutting off of the leading and trailing end portions of a strip of material originating from a coil or other suitable source, with a minimum of manual effort, skill and time, to form compact coils. In either case a compact coil of the cut off material is formed, which may be easily handled and disposed of. The apparatus makes possible such rapid cutting and winding of scrap portions of strip material that very little production time is lost, thus making possible substantial savings in production costs.

From the foregoing description of two embodiments of the invention, it will be evident that we have provided an apparatus that will function reliably and efficiently to cut and wind strip material, whether it be a leading end, tail end, or even an intermediate portion of the strip. The apparatus is of sturdy construction and is substantially fool-proof in operation. While the invention has been described herein primarily in connection with the cutting and winding of strip steel, those skilled in the art will appreciate that it may be adapted to other purposes and uses and that various changes and modifications can be made in the preferred form described herein without departing from the spirit and scope of the invention.

We claim:

1. Apparatus for cutting and winding a strip disposed in a path extending transversely of the apparatus, comprising a rotatable mandrel supported from one end only and having the other end free, said mandrel having a slot extending transversely therethrough and inwardly from its free end for a distance corresponding to at least a major portion of the width of said strip; means supporting said mandrel for rotation and for reciprocation between a retracted position in which it clears said strip and an extended position in which it extends transversely into the path of said strip; means for moving said mandrel between its retracted and its extended positions; means adapted positively to rotate said mandrel; means for controlling the rotation of said mandrel to locate its slot with its transverse direction aligned with the path of said strip while the mandrel is in its retracted position, to maintain the mandrel with its slot so positioned to receive said strip in said slot as the mandrel moves from its retracted to its extended position, and to rotate said mandrel while it is in its extended position to wind the strip into a coil; and means on each side of the mandrel for cutting the strip to form a strip portion detached from the remainder of the strip, which portion can be wound on the mandrel.

2. Apparatus for engaging and winding a strip disposed in a path extending transversely of the apparatus, comprising a cantilever rotatable mandrel supported from one end only and having the other end free, said mandrel having a slot extending transversely therethrough and inwardly from its free end to a distance corresponding to at least a major portion of the width of said strip and being adapted to be expanded to an enlarged cross section and to be collapsed to a smaller cross section; means supporting said mandrel for rotation and for reciprocation between a retracted position in which it clears said strip and an extended position in which it extends transversely into the path of said strip; means for moving said mandrel between its retracted and its extended positions; means for expanding said mandrel to its enlarged cross section while it is in its extended position, and for collapsing said mandrel to its smaller cross section as it is moved to its retracted position; means adapted positively to rotate said mandrel; means for controlling the rotation of said mandrel to locate its slot with its transverse direction aligned with the path of said strip while the mandrel is in its retracted position, to maintain the mandrel with its slot so positioned to receive said strip in said slot as the mandrel moves from its retracted to its extended position, to rotate said mandrel while it is in its extended position to wind the strip in a coil to halt rotation of the mandrel and to move the mandrel to its retracted position while it is not rotating to aid in stripping the coil therefrom; and means on each side of the mandrel for cutting the strip to form a strip portion detached from the remainder of the strip, which portion can be wound on the mandrel.

3. Apparatus for engaging and winding a strip disposed in a path extending transversely of the apparatus, comprising a cantilever rotatable mandrel supported from one end only and having the other end free, said mandrel having a slot extending transversely therethrough and inwardly from its free end for a distance corresponding to at least a major portion of the width of said strip, said mandrel being of unitary construction and the surface thereof on which the strip is wound being tapered to a smaller diameter at the free end of said mandrel; means for supporting said mandrel for rotation and reciprocation between a retracted position in which it clears said strip and an extended position in which it extends transversely into the path of said strip; means for moving said mandrel between its retracted and its extended positions; means adapted positively to rotate said mandrel; means for controlling the rotation of said mandrel to locate its slot with its transverse direction aligned with the path of said strip while the mandrel is in its retracted position to maintain the mandrel with its slot so positioned to receive said strip in said slot as the mandrel moves from its retracted to its extended position, and to rotate said mandrel while it is in its extended position to wind the strip into a coil to halt rotation of the mandrel, and to move the mandrel to its retracted position while it is not rotating to aid in stripping the coil therefrom; and means on each side of the mandrel for cutting the strip to form a strip portion detached from the remainder of the strip, which portion can be wound on the mandrel.

4. Apparatus for winding a strip disposed in a path extending transversely of the apparatus, comprising a rotatable mandrel having a slot extending transversely through the mandrel and longitudinally thereof for a distance corresponding to at least the major portion of the width of the strip, means for retracting said mandrel to a position where it clears said strip and for extending said mandrel to a position where it receives at least a major portion of the width of said strip in its slot, means for expanding said mandrel to an enlarged cross section when in its extended position for collapsing said mandrel to a smaller cross section before being moved to its retracted position.

5. Apparatus for cutting and coiling an end portion of a strip, comprising a rotatable mandrel having a slot extending transversely through the mandrel and longitudinally thereof for a distance corresponding to at least a major portion of the width of the strip, means for retracting said mandrel to a position where it clears said strip and for extending said mandrel with its slot aligned with said strip to a position where it receives at least a major portion of the width of said strip in said slot before cutting of said strip, means for expanding said mandrel to an enlarged cross section when in its extended position and for collapsing said mandrel to a smaller cross section before being moved to its retracted position, means for cutting said strip while it extends into said mandrel slot, means for rotating said mandrel while it is in its extended position and its slot contains the end of said strip to wind said strip into a coil on said mandrel, and means for stripping said coil from said mandrel as it is retracted.

6. The method of transversely cutting and coiling leading and tail end portions from a strip adapted to travel to a processing line in a path extending longitudinally of the strip, comprising extending a rotatable reciprocable cantilever mandrel having a slot extending transversely therethrough and inwardly from its free end while the slot is aligned with the path of the strip; engaging with said slot the free end of the leading portion of said strip; rotating the mandrel until the desired length of leading portion of the strip has been wound on the mandrel in the form of a coil; transversely severing the strip in the vicinity of the mandrel at the side of the mandrel at which the strip travels to the mandrel to detach the coil from the strip; retracting the mandrel to strip the coil therefrom; extending the mandrel with its slot aligned with path of the strip; and moving said strip longitudinally thereof with at least a major portion of its width passing through the slot of said mandrel while said mandrel is stationary, until the beginning of the desired tail portion of the strip passes through the slot in the mandrel; transversely severing the strip in the vicinity of the mandrel at the side of the mandrel at which the strip travels away from the mandrel to detach the tail portion of the strip from the strip; rotating the mandrel until the entire tail portion of the strip has been wound on said mandrel in the form of a coil; and withdrawing the mandrel to strip the coil therefrom.

7. The method of transversely cutting and coiling a leading portion of a strip which is adapted to travel to a processing line in path extending longitudinally of the strip, comprising extending a single rotatable reciprocable cantilever mandrel having a slot extending transversely therethrough and inwardly from its free end while the slot is aligned with the path of the strip; engaging with the slot the free end of the leading portion of the strip; rotating said mandrel until a predetermined length of the leading portion of the strip has been wound on the mandrel in the form of a coil; transversely severing the strip in the vicinity of the mandrel at the side of the mandrel at which the strip travels to the mandrel to detach the coil from the strip; stripping the coil from the mandrel by retracting the mandrel axially while restraining the coil against axial movement in the direction of retraction of the mandrel; extending said mandrel with its slot aligned with the path of travel of said strip; and moving said strip longitudinally thereof with at least a major portion of the width of said strip passing through the slot of said mandrel while it is stationary until the beginning of the tail portion of the strip reaches the vicinity of the mandrel, and transversely severing the strip in the vicinity of the mandrel at the side of the mandrel at which the strip travels away from the mandrel to detach the tail portion of the strip from the strip.

8. Apparatus for cutting and winding a strip, comprising a rotatable mandrel having a slot extending transversely through the mandrel and longitudinally thereof for a distance corresponding to at least a major portion of the width of said strip; means supporting said mandrel for rotation and for reciprocation between a retracted position where it clears said strip, and an extended position in which it extends transversely into the path of said strip with its slot aligned with said strip to receive at least a major portion of the width of said strip in said slot before cutting of said strip; means on each side of said mandrel for cutting said strip to form a strip portion detached from the remainder of the strip, which portion can be wound on the mandrel; means for rotating said mandrel while it is in its extended position and its slot contains an end of said strip to wind said strip into a coil on said mandrel; and means for bearing against said coil to strip it from said mandrel as said mandrel is retracted.

9. Apparatus for cutting and winding a strip disposed in a path extending transversely of the apparatus, comprising a rotatable mandrel having a slot extending transversely therethrough and longitudinally thereof for a distance corresponding to at least a major portion of the width of said strip; means supporting said mandrel for rotation and for reciprocation between a retracted position in which it clears said slot and an extended position in which it extends transversely into the path of said strip; means for moving said mandrel between its retracted and its extended positions; means adapted positively to rotate said mandrel; means for controlling the rotation of said mandrel to align its slot with the path of said strip while the mandrel is in its retracted position, to maintain said mandrel with its slot so positioned to receive said strip in said slot as said mandrel moves from its retracted to its extended position, and to rotate said mandrel while it is in its extended position to wind said strip into a coil; and means on each side of said mandrel for cutting said strip to form a strip portion detached from the remainder of the strip, which portion can be wound on the mandrel.

10. Apparatus for cutting and winding a strip, comprising a rotatable mandrel having a slot extending transversely through the mandrel and longitudinally thereof for a distance corresponding to at least a major portion of the width of said strip, means for retracting said mandrel to a position where it clears said strip and for extending said mandrel with its slot aligned with said strip to a position where it receives at least a major portion of the width of said strip in said slot before cutting of said strip, means for expanding said mandrel to an enlarged cross section when in its extended position and for collapsing said mandrel to a smaller cross section before being moved to its retracted position, means on each side of said mandrel for cutting the strip to form a strip portion detached from the remainder of the strip, which portion can be wound on the mandrel, and means for rotating said mandrel while it is in its extended position and its slot contains the end of said strip to wind said strip into a coil on said mandrel.

References Cited in the file of this patent

UNITED STATES PATENTS

| | | | |
|---|---|---|---|
| 952,282 | Skofsrud | Mar. 15, | 1910 |
| 1,601,784 | Wanders | Oct. 5, | 1926 |
| 2,202,563 | Mikaelson | May 28, | 1940 |
| 2,299,101 | MacChesney | Oct. 20, | 1942 |
| 2,928,622 | Herr | Mar. 16, | 1960 |

FOREIGN PATENTS

| 1,040,088 | France | May 20, 1953 |
|---|---|---|